United States Patent
Zhu et al.

(10) Patent No.: US 11,257,187 B2
(45) Date of Patent: Feb. 22, 2022

(54) IMAGE PROCESSING METHOD, IMAGE PROCESSING DEVICE AND COMPUTER STORAGE MEDIUM

(71) Applicant: BOE TECHNOLOGY GROUP CO., LTD., Beijing (CN)

(72) Inventors: Dan Zhu, Beijing (CN); Pablo Navarrete Michelini, Beijing (CN); Hanwen Liu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/521,808

(22) Filed: Jul. 25, 2019

(65) Prior Publication Data
US 2020/0034951 A1    Jan. 30, 2020

(30) Foreign Application Priority Data
Jul. 26, 2018    (CN) .......................... 201810835406.X

(51) Int. Cl.
*G06T 7/00* (2017.01)
*G06T 5/00* (2006.01)

(52) U.S. Cl.
CPC .... *G06T 5/002* (2013.01); *G06T 2207/10024* (2013.01)

(58) Field of Classification Search
CPC .......... G06T 5/002; G06T 2207/10024; G06T 7/90; G06T 2207/20024; G06T 5/20; G06K 9/40
See application file for complete search history.

(56) References Cited

U.S. PATENT DOCUMENTS

| | | | |
|---|---|---|---|
| 6,195,467 B1 * | 2/2001 | Asimopoulos | G06T 5/20 382/192 |
| 7,590,303 B2 * | 9/2009 | Lee | G06K 9/40 382/260 |
| 9,002,131 B2 * | 4/2015 | Rao | G06T 5/002 382/261 |
| 2004/0160439 A1 * | 8/2004 | Xavier | G06T 3/403 345/419 |
| 2014/0293076 A1 | 10/2014 | Hiasa | |

(Continued)

FOREIGN PATENT DOCUMENTS

| CN | 103020917 A | 4/2013 |
|---|---|---|
| CN | 103914813 A | 7/2014 |

(Continued)

OTHER PUBLICATIONS

Xue et al., Video Image Dehazing Algorithm Based on Multi-scale Retinex with Color Restoration, 2016, International Conference on Smart Grid and Electrical Automation, 196-197 (Year: 2016).*

(Continued)

*Primary Examiner* — Li Liu
(74) *Attorney, Agent, or Firm* — Brooks Kushman P.C.

(57) ABSTRACT

An image processing method, an image processing device and a computer storage medium are provided. The method includes: performing a maximum-filtering processing on an original image and obtaining a luminance channel of the image; and performing a guided-filtering processing on the obtained luminance channel, and estimating and obtaining an incident component.

16 Claims, 3 Drawing Sheets

---

101 — Performing a maximum-filtering processing on an original image and obtains a luminance channel of the image 102 — Performing a guided-filtering processing on the obtained luminance channel, and estimating and obtaining an incident component

(56) References Cited

U.S. PATENT DOCUMENTS

| | | | | |
|---|---|---|---|---|
| 2015/0016720 A1* | 1/2015 | Vermeir | ............ | G06T 5/20 382/166 |
| 2016/0063349 A1* | 3/2016 | Kern | ............ | G06K 9/52 382/199 |
| 2018/0129893 A1* | 5/2018 | Son | ............ | G06N 3/063 |

FOREIGN PATENT DOCUMENTS

| | | | |
|---|---|---|---|
| CN | 104050637 | A | 9/2014 |
| CN | 104079818 | A | 10/2014 |
| CN | 104318524 | A | 1/2015 |
| CN | 104954770 | A | 9/2015 |
| CN | 106846263 | A | 6/2017 |
| CN | 106897981 | A | 6/2017 |

OTHER PUBLICATIONS

Rahman et al., Retinex processing for automatic image enhancement, Jan. 2004, Journal of Electronic Imaging 13(1), 100-110 (Year: 2004).*

Getreuer, Pascal, "Automatic Color Enhancement (ACE) and its Fast Implementation," Image Processing On Line, Nov. 6, 2012, pp. 266-277, vol. 2, url{https://doi.org/10.5201/ipol.2012.g-ace (12 Pages).

First Office Action for Chinese Application No. 201810835406.X, dated Feb. 20, 2021, 8 Pages.

Second Office Action for Chinese Application No. 201810835406.X, dated Sep. 17, 2021, 7 Pages.

\* cited by examiner

Fig. 4
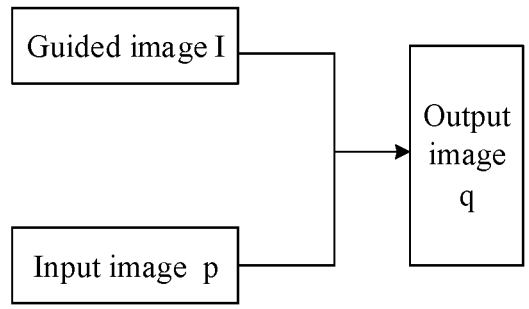
Fig. 5
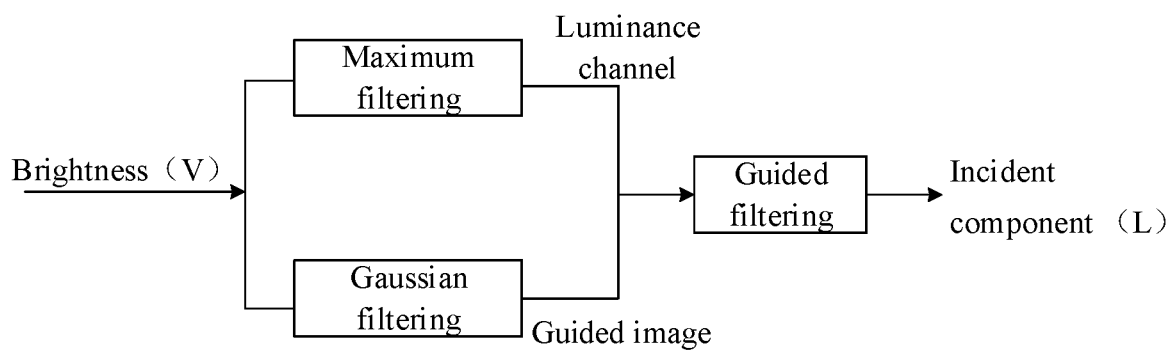
Fig. 6

IMAGE PROCESSING METHOD, IMAGE PROCESSING DEVICE AND COMPUTER STORAGE MEDIUM

CROSS-REFERENCE TO RELATED APPLICATION

This application claims priority to Chinese Patent Application No. 201810835406.X filed on Jul. 26, 2018, which is incorporated herein by reference in its entirety.

TECHNICAL FIELD

The present disclosure relates to a field of a multi-media processing technology, and in particular, relates to an image processing method, an image processing device and a computer storage medium.

BACKGROUND

A color digital image is an important carrier for human to acquire and transmit information. However, acquisition of the color digital image is inevitably affected by illumination conditions, resulting in a color cast phenomenon which seriously affects a display quality of the color digital image. How to effectively suppress an influence of the illumination conditions on color information in the color digital image and provide more reliable color information for subsequent image processing processes is a focus of an image processing research.

SUMMARY

Some embodiments of the present disclosure provide an image processing method, an image processing device and a computer readable storage medium.

In a first aspect, an image processing method is provided in the present disclosure and includes performing a maximum-filtering processing on an original image and obtaining a luminance channel of the image; and performing a guided-filtering processing on the obtained luminance channel, and estimating and obtaining an incident component.

Optionally, the performing the maximum-filtering processing on the original image, includes: performing the maximum-filtering processing on a luminance component of the original image.

Optionally, performing the guided-filtering processing on the obtained luminance channel includes: performing a Gaussian-filtering processing on the original image and obtaining a guided image; performing the guided-filtering processing on the obtained luminance channel through the obtained guided image, and estimating and obtaining the incident component.

Optionally, after the estimating and obtaining the incident component, the method further includes: performing a correction processing on the estimated and obtained incident component according to a predefined correction formula.

Optionally, the correction formula includes:

$$L' = W\left(\frac{L}{W}\right)^{\frac{1}{\gamma}},$$

wherein, $W=2^b-1$, b is a quantity of bits in the original image, $\gamma$ is a predefined correction factor.

Optionally, the maximum-filtering processing includes: obtaining a maximum pixel value from neighborhood pixels and taking the maximum pixel value as a pixel value in an output image.

In a second aspect, an image processing device is provided in the present disclosure and includes a first circuit, configured to perform a maximum-filtering processing on an original image and obtain a luminance channel of the image; and a second circuit, configured to perform a guided-filtering processing on the obtained luminance channel, and estimate and obtain an incident component.

Optionally, the first circuit is specifically configured to: perform the maximum-filtering processing on a luminance component of the original image and obtain the luminance channel.

Optionally, the second circuit is specifically configured to: perform a Gaussian-filtering processing on the original image and obtain a guided image; perform the guided-filtering processing on the obtained luminance channel through the obtained guided image, and estimate and obtain the incident component.

Optionally, the image processing device further includes a third circuit, configured to perform, according to a predefined correction formula, a correction processing on the incident component estimated and obtained by the second circuit.

Optionally, the correction formula includes:

$$L' = W\left(\frac{L}{W}\right)^{\frac{1}{\gamma}},$$

wherein, $W=2^b-1$, b is a quantity of bits in the original image, $\gamma$ is a predefined correction factor.

Optionally, the maximum-filtering processing performed by the first circuit, includes: obtaining a maximum pixel value from neighborhood pixels and taking the maximum pixel value as a pixel value in an output image.

In a third aspect, an image processing device is provided in the present disclosure and includes a storage, a processor, and computer programs stored in the storage and executable by the processor, wherein the processor is configured to read and execute the computer programs in the storage and execute steps of the image processing method according to the first aspect.

In a fourth aspect, a non-volatile computer storage medium is further provided in the present disclosure and includes computer executable instructions stored on the non-volatile computer storage medium, wherein when the computer executable instructions are executed by a processor, steps of the image processing method according to the first aspect executed by the processor.

BRIEF DESCRIPTION OF THE DRAWINGS

Accompanying drawings are configured to facilitate thorough understanding of a technical solution of the present disclosure and form a part of the specification. The drawings together with embodiments of the present disclosure are used to explain the technical solution of the present disclosure, but do not constitute a limitation on the technical solution of the present disclosure.

FIG. 4 is a schematic diagram illustrating performing a window-sliding operation according to an application example of the present disclosure;

FIG. 5 is a schematic diagram illustrating a guided filtering processing according to an application example of the present disclosure;

FIG. 6 is a flowchart illustrating illumination estimation according to an application example of the present disclosure.

DETAILED DESCRIPTION

Figure 1:
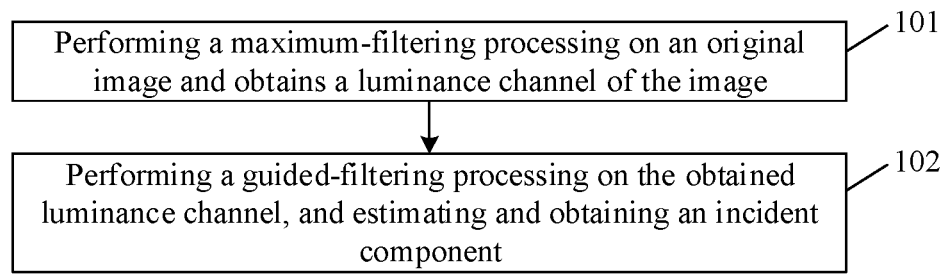
FIG. 1 is a flowchart illustrating an image processing method according to some embodiments of the present disclosure.

In order to make an objective, a technical solution and an advantage of the present disclosure clearer, the embodiments of the present disclosure will be illustrated in details hereinafter with reference to the accompanying drawings. It should be noted that, without conflict, the embodiments of the present disclosure and features in the embodiments may be arbitrarily combined with each other.

Steps shown in the flowchart of the drawings may be executed by a computer system including a set of computer executable instructions. Moreover, although a logic order is shown in the flowchart, an order in which the steps shown or described herein are performed may be different from that shown herein in some case.

A Retinex is an abbreviation of a combination of Retina and Cortex. A Retinex theory is an image enhancement theory based on a Human Visual System and is built on a basis of scientific experiments and analyses. The Retinex theory is a constant-color visual theory based on visual brightness and color perception of human beings. An essence of the Retinex theory is to remove an influence of an incident component from an image and obtain a reflection component of an object, so as to obtain an original image. It is disclosed in the related art that a linear guided-filtering processing with an edge-preserving property is performed to an illuminated image in a Hue-Saturation-Value (HSV) color space and an illumination component of an image is obtained. According to the Retinex theory, a reflection component of the image is obtained by logarithmic transformation, and the reflection component of the image is corrected by using a Gamma transformation. The method only performs the guided-filtering processing on an image and obtains the incident component; then obtains the reflection component in a logarithmic domain and obtains the final result through correction. A final enhancement effect for the image is poor. It is also disclosed in the related art that final pixel values may be corrected by using a differential method to calculate relative brightness relations between a target pixel point and surrounding pixel points. This method has a better image enhancement effect, however, as a size of a selected sliding window is increased, a computational complexity and a computing time increase exponentially.

The above methods have problems of a poor enhancement effect or a large computing amount, and may not be effectively applied in engineering fields.

An image processing method, an image processing device and a computer storage medium provided in some embodiments of the present disclosure may reduce a computing amount of an image processing process while the image enhancement effect is guaranteed.

Other features and merits of the present disclosure will be described hereinafter, and become apparent in part from the specification, or may be understood by implementing the present disclosure. The purpose and other merits of the present disclosure may be achieved and acquired by means of the structures specifically pointed out in the description, the claims and the drawings.

FIG. 1 is a flowchart illustrating an image processing method according to some embodiments of the present disclosure. As shown in FIG. 1, the method includes steps 101-102.

Step 101: performing a maximum-filtering processing on an original image and obtains a luminance channel of the image.

It should be noted that, the maximum-filtering processing in some embodiments of the present disclosure includes obtaining a maximum pixel value from neighborhood pixels and taking the maximum pixel value as a pixel value in an output image. Specifically, the maximum-filtering processing includes: setting a window size (i.e., a kernel size) of a window; determining, according to the window size, the number of rows and the number of columns of edges to be zero-padded, wherein the number of rows and the number of columns of edges to be zero-padded in the embodiments of the present disclosure may be calculated according to "(window size−1)/2"; traversing each row of pixels from left to right in the zero-padded image; comparing a central pixel value with a maximum pixel value within the window, and if the central pixel value is smaller than the maximum pixel value, then replacing the central pixel value in the window with the maximum pixel value, that is, the maximum pixel value in the window is taken as the central pixel value; after the traversing in the window having the window size is completed, reducing the window size by a predefined step size, and repeating the above traversing until the window size is 1 and a luminance channel of the image is obtained.

Optionally, the performing the maximum-filtering processing on the original image, includes: performing the maximum-filtering processing on a luminance component of the original image.

Step 102: performing a guided-filtering processing on the obtained luminance channel, and estimating and obtaining an incident component of the image.

Optionally, performing the guided-filtering processing on the obtained luminance channel includes: performing a Gaussian-filtering processing on the original image and obtaining a guided image; performing the guided-filtering processing on the obtained luminance channel through the obtained guided image and estimating and obtaining the incident component.

Optionally, after the estimating and obtaining the incident component, the method further includes: performing a correction processing on the estimated and obtained incident component according to a predefined correction formula.

Optionally, the correction formula includes:

$$L' = W\left(\frac{L}{W}\right)^{\frac{1}{\gamma}},$$

wherein, $W = 2^b - 1$, b is the number of bits in the original image, γ is a predefined correction factor.

It should be noted that, the γ may be determined by those skilled in the art based on experience. For example, a value of the γ may be set to be 2.2.

Compared to the related art, the technical solution of the present disclosure includes: performing a maximum-filtering processing on an original image and obtaining a luminance channel of the image; and performing a guided-filtering processing on the obtained luminance channel, and estimating and obtaining an incident component. The present disclosure may reduce a computing amount of an image processing process while an image enhancement effect is guaranteed.

Figure 2:
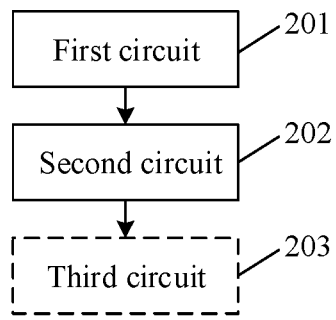
FIG. 2 is a block diagram illustrating a structure of an image processing device according to some embodiments of the present disclosure.

FIG. 2 is a block diagram illustrating a structure of an image processing device according to some embodiments of the present disclosure. As shown in FIG. 2, the image processing device includes a first circuit 201 and a second circuit 202.

The first circuit 201 is configured to perform a maximum-filtering processing on an original image and obtains a luminance channel of the image.

It should be noted that, the maximum-filtering processing in some embodiments of the present disclosure includes obtaining a maximum pixel value from neighborhood pixels and taking the maximum pixel value as a pixel value in an output image. Specifically, the maximum-filtering processing includes: setting a window size (i.e., a kernel size) of a window; determining, according to the window size, the number of rows and the number of columns of edges to be zero-padded, wherein the number of rows and the number of columns of edges to be zero-padded in the embodiments of the present disclosure may be calculated according to "(window size−1)/2"; traversing each row of pixels from left to right in the zero-padded image; comparing a central pixel value with a maximum pixel value within the window, and if the central pixel value is smaller than the maximum pixel value, then replacing the central pixel value in the window with the maximum pixel value, that is, the maximum pixel value in the window is taken as the central pixel value; after the traversing in the window having the window size is completed, reducing the window size by a predefined step size, and repeating the above traversing until the window size is 1 and a luminance channel of the image is obtained.

Optionally, the first circuit 201 in the embodiments of the present disclosure is configured to perform the maximum-filtering processing on a luminance component of the original image so as to obtain the luminance channel.

The second circuit 202 is configured to perform a guided-filtering processing on the obtained luminance channel, and estimate and obtain an incident component.

Optionally, the second circuit 202 in the embodiments of the present disclosure is configured to perform a Gaussian-filtering processing on the original image and obtain a guided image; perform the guided-filtering processing on the obtained luminance channel through the obtained guided image and estimate and obtain the incident component.

Optionally, the image processing device further includes a third circuit 203. The third circuit 203 is configured to perform, according to a predefined correction formula, a correction processing on the incident estimated and obtained by the second circuit component.

Optionally, the correction formula in the embodiments of the present disclosure includes:

$$L' = W\left(\frac{L}{W}\right)^{\frac{1}{\gamma}},$$

wherein, $W=2^b-1$, b is the number of bits in the original image, γ is a predefined correction factor.

It should be noted that, the γ may be determined by those skilled in the art based on experience. For example, a value of the γ may be set to be 2.2.

Compared to the related art, the technical solution of the present disclosure includes: performing a maximum-filtering processing on an original image and obtaining a luminance channel of the image; and performing a guided-filtering processing on the obtained luminance channel, and estimating and obtaining an incident component. The present disclosure may reduce a computing amount of an image processing process while an image enhancement effect is guaranteed.

Some embodiments of the present disclosure also provide a computer storage medium. The computer storage medium includes computer executable instructions stored on the computer storage medium, wherein when the computer executable instructions are executed by a computer, the steps of the above image processing methods are executed by the computer.

The computer storage medium in the present disclosure may be a volatile computer readable storage medium or a non-volatile computer readable storage medium, such as a Read Only Memory (ROM), a Random Access Memory (RAM), a magnetic disk or a compact disc (CD).

A clear and detailed description of the method provided in the embodiments of the present disclosure will be provided by means of application examples hereinafter. The application examples are only used to explain the present disclosure and not to limit the protection scope of the present disclosure.

In order to make the application examples of the present disclosure clearer, technical solutions of the present disclosure are briefly described below.

Figure 3:
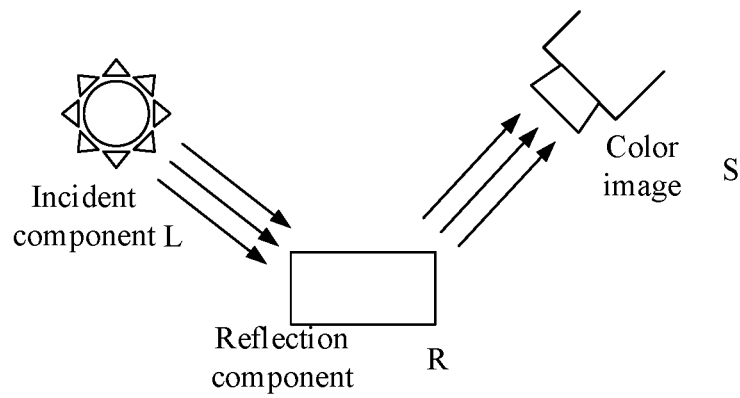
FIG. 3 is a schematic diagram illustrating a principle of Retinex.
Figure 7:
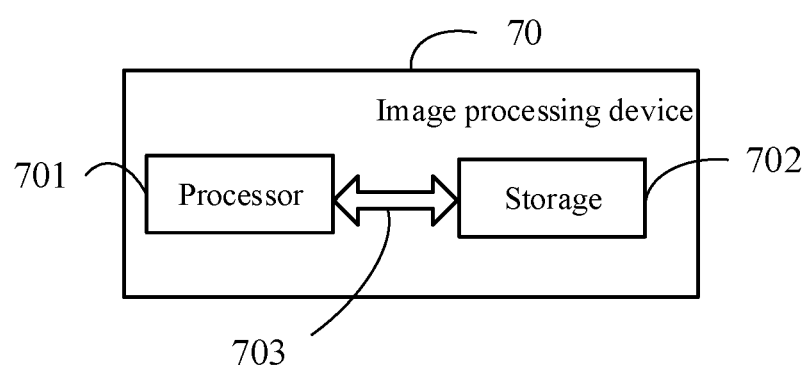
FIG. 7 is a block diagram illustrating another structure of the image processing device according to some embodiments of the present disclosure.

According to the Retinex theory, an image mainly includes an incident component and a reflection component, and a relation between the incident component and the reflection component is as follows: S=L×R, wherein L represents the incident component, R represents the reflection component, and S is a color image composed by an observer or a camera. Generally, the incident component L directly determines a dynamic range achievable by pixels in an image, and the reflection component R determines intrinsic properties of the image. FIG. 3 is a schematic diagram illustrating a principle of the Retinex. As shown in FIG. 3, a purpose of the Retinex theory is to obtain an original appearance of an object by discarding a property of the incident component from the image S.

An application example in the present disclosure assumes that the incident component and the reflection component satisfy the following assumptions:

1) a space in which the incident component L is located is uniform enough;

2) a value of the reflection component R is limited to a range of 0 to 1, i.e., L≥S.

Assuming that the incident component is a constant, the constant is greater than any point in S, and the constant is a trivial solution satisfying the above two assumptions; that is, L is infinitely close to S but larger than S.

A Hue (H), Saturation (S), Value (V) space (a HSV space) is a space in which H, S, and V are used as color values to locate colors. Compared to a Red®, Green (G) and Blue (B) space (a RGB space), the HSV space may express brightness, hue, and vividness of a color very intuitively, and is convenient for contrast among colors and convenient for emotional communication. The HSV space is a color space based on a user experience.

The application example of the present disclosure may be built on the HSV space, and only a V component is processed and then the HSV space is converted to the RGB space.

The application example of the present disclosure may perform a maximum-filtering processing on an original image and obtains a luminance channel of the image, wherein a maximum pixel value is obtained from neighborhood pixels and taken as a pixel value in an output image. Specifically, the maximum-filtering processing includes: setting a window size (i.e., a kernel size) of a window; determining, according to the window size, the number of rows and the number of columns of edges to be zero-padded, wherein the number of rows and the number of columns of edges to be zero-padded in the application example of the present disclosure may be calculated according to "(window size−1)/2"; traversing each row of pixels from left to right in the zero-padded image; comparing a central pixel value with a maximum pixel value within the window, and if the central pixel value is smaller than the maximum pixel value, then replacing the central pixel value in the window with the maximum pixel value, that is, the maximum pixel value in the window is taken as the central pixel value; after the traversing in the window having the window size is completed, reducing the window size by a predefined step size, and repeating the above traversing until the window size is 1 and a luminance channel of the image is obtained. The traversing will be illustrated below by way of example.

FIG. 4 is a schematic diagram illustrating performing a window-sliding operation according to the application example of the present disclosure. In FIG. 4, pixel positions with a value zero at four edges are positions being zero-padded; a first window in a first row is a first window in which a central pixel value is compared with a maximum pixel value; because the maximum pixel value is 5, the central pixel value 3 is replaced with the maximum pixel value 5. After the central pixel value in the first window is replaced, the window slides rightwards to a second window; the maximum pixel value in the second window is 8 and the central pixel value is 1, the central pixel value is replaced with 8. After the central pixel value is replaced with 8, the window slides rightwards to a third window; the maximum pixel value in the third window is 8 and the central pixel value is 2, the central pixel value is replaced with 8. After the window-sliding operation in the first row is finished, traversing is performed for each subsequent row of pixels according to the above method.

In the application example of the present disclosure, performing the guided-filtering processing on the luminance channel obtained through performing the maximum-filtering processing includes: performing a Gaussian-filtering processing on the original image and obtaining a guided image; performing the guided-filtering processing on the obtained luminance channel through the obtained guided image and estimating and obtaining the incident component L.

The guided filtering is a kind of filter that needs a guided image. The guided filtering has a special function of preserving edges while performing the filtering, and may be used for noise reduction, detail smoothing, high-dynamic range (HDR) image compression, matting, defogging and joint sampling. The guided filtering performed to an image is a linear shift-variable filtering process which includes a guided image I, an input image p and an output image q. The guided image I needs to be determined in advance according to a specific application, or the input image p may also be taken as the guided image p directly. A calculation method for an i-th pixel of the output image can be expressed as follows:

$$q_i = \sum_j W_{ij}(I) p_j$$

wherein, i and j are pixel labels;

$$W_{ij}(I) = \frac{1}{|\omega|^2} \sum_{k:(i,j)\in w_k} \left(1 + \frac{(1-\mu_k)(I_j - \mu_k)}{\sigma_k^2 + \varepsilon}\right),$$

is a filtering kernel function; in the filtering kernel function, $w_k$ is a kth window of the kernel function, $|w|$ is the number of pixels in the window; $\mu_k$ and $\sigma_k^2$ are a mean and a variance of the guided image I in the window, respectively; and $\varepsilon$ is a smoothing factor. FIG. 5 is a schematic diagram illustrating a principle of the guided filtering according to the application example of the present disclosure. As shown in FIG. 5, the guided image I and the input image p are processed respectively, and the output image q is obtained by calculation. The guided filtering for an image is a linear shift-variable filtering process which includes the guided image I (i.e., the guided image), the input image p and the output image q. The guided filtering process of the input image p is performed through the guided image I, so that contents of the output image q are similar to those of the input image p, but textures of the output image are similar to textures of the guide graph I.

In the application example of the present disclosure, contents of the luminance channel obtained through performing the maximum-filtering processing are similar to those of the original image, are formed of many bright and dark blocks, and are extremely uneven. Therefore, the guided-filtering processing is needed to ensure spatial smoothness of the output image. A Gaussian filtering is performed on the original image to obtain the guided image. The guided image is an original image subjected to a Gauss blur processing, and a space is uniformly blurred. The guided-filtering processing is performed on the luminance channel by means of the guided image, and the estimated incident component L is obtained. Contents of the incident component L are similar to those of the luminance channel, and a spatial uniformity of the incident component is similar to that of the guided image.

FIG. 6 is a flowchart illustrating illumination estimation according to the application example of the present disclosure. As shown in FIG. 6, with brightness (V) being taken as input, an image with the brightness is processed by a maximum-filtering processing and a Gaussian-filtering processing in the application example of the present disclosure, and the luminance channel and the guided image are obtained. The guided-filtering processing is performed on the luminance channel by the guided image so as to obtain the estimated incident component L.

Further, in the application example of the present disclosure, correction is performed on the obtained incident component L according to a preset strategy. Specifically, according to the Retinex theory, the reflection component R=S/L. Because the incident component includes illumination information, adjusting the incident component may produce a visual effect of a dark image which is closer to a real image. The application example of the present disclosure performs correction on the obtained incident component based on γ, and the correction formula is as follows:

$$L' = W\left(\frac{L}{W}\right)^{\frac{1}{\gamma}},$$

wherein, $W=2^b-1$, b is the number of bits of the original image, such as for an 8-bit image, b=8 and W=255. Then, the enhanced image S' is: S'=L'×R. γ may be determined by those skilled in the art based on experience, for example, a value of γ may be set as 2.2.

In order to achieve the above purpose in a better way, some embodiments of the present disclosure also provide an image processing device 70. The image processing device 70 includes a storage 702, a processor 701, a bus interface 703 and computer programs stored in the storage 702 and executable by the processor 701. The bus interface 703 may include any number of interconnected buses and bridges, specifically various circuits including one or more processors represented by the processor 701 and one or more storages represented by the storage 702 are connected together.

The processor 701 is configured to read the programs in storage 702 and execute the steps in the method as shown in FIG. 1. Details of the steps of the method may be obtained by referring to the contents described above in conjunction with FIG. 1 and will not repeat herein.

Compared to the related art, the technical solution of the present disclosure includes: performing a maximum-filtering processing on an original image and obtaining a luminance channel of the image; and performing a guided-filtering processing on the obtained luminance channel, and estimating and obtaining an incident component. The present disclosure may reduce a computing amount of an image processing process while an image enhancement effect is guaranteed.

Those ordinary skilled in the art may understand that all or a part of steps for implementing the above method may be finished by instructing related hardware (e.g., a processor) through programs. The programs may be stored in a computer readable storage medium, such as a read-only memory, a disk or a CD-ROM. Optionally, all or a part of the steps of the above embodiments may also be implemented by using one or more integrated circuits. Accordingly, each module/unit in the above embodiments may be implemented by hardware, e.g. integrated circuits, or be implemented by software function modules, e.g. implemented by programs/instructions stored in a storage and executed by a processor. The present disclosure is not limited to any specific combination of hardware and software.

Although the embodiments are disclosed in the present disclosure as above, the contents described above are only used to facilitate understanding the present disclosure, and are not intended to limit the present disclosure. Those skilled in the art may make various modifications and changes to forms and details of the present disclosure without departing from the spirit and the scope of the present disclosure. The protection scope of the present disclosure should still be defined according to the scope defined in the appended claims.

What is claimed is:

1. An image processing method, comprising:
    performing a maximum-filtering processing on an original image and obtaining a luminance channel of the image; and
    performing a guided-filtering processing on the obtained luminance channel, and estimating and obtaining an incident component;
    wherein the maximum-filtering processing includes:
    setting a window size of a window;
    determining, according to the window size, the number of rows and the number of columns of edges to be zero-padded;
    traversing each row of pixels from left to right in the zero-padded image;
    comparing a central pixel value with a maximum pixel value within the window, and if the central pixel value is smaller than the maximum pixel value, then replacing the central pixel value in the window with the maximum pixel value;
    after the traversing in the window having the window size is completed, reducing the window size by a predefined step size, and repeating the above traversing until the window size is 1 and a luminance channel of the image is obtained.

2. The image processing method according to claim 1, wherein the performing the maximum-filtering processing on the original image, comprises:
    performing the maximum-filtering processing on a luminance component of the original image.

3. The image processing method according to claim 1, wherein, performing the guided-filtering processing on the obtained luminance channel comprises:
    performing a Gaussian-filtering processing on the original image and obtaining a guided image;
    performing the guided-filtering processing on the obtained luminance channel through the obtained guided image, and estimating and obtaining the incident component.

4. The image processing method according to claim 1, wherein after the estimating and obtaining the incident component, the method further comprises:
    performing a correction processing on the estimated and obtained incident component according to a predefined correction formula.

5. The image processing method according to claim 4, wherein the correction formula comprises:

$$L' = W\left(\frac{L}{W}\right)^{\frac{1}{\gamma}},$$

wherein, $W=2^b-1$, b is a quantity of bits in the original image, γ is a predefined correction factor.

6. The image processing method according to claim 1, wherein the maximum-filtering processing comprises:
    obtaining a maximum pixel value from neighborhood pixels and taking the maximum pixel value as a pixel value in an output image.

7. An image processing device, comprising:
    a first circuit, configured to perform a maximum-filtering processing on an original image and obtain a luminance channel of the image; and
    a second circuit, configured to perform a guided-filtering processing on the obtained luminance channel, and estimate and obtain an incident component;

wherein the maximum-filtering processing includes:

setting a window size of a window;

determining, according to the window size, the number of rows and the number of columns of edges to be zero-padded;

traversing each row of pixels from left to right in the zero-padded image;

comparing a central pixel value with a maximum pixel value within the window, and if the central pixel value is smaller than the maximum pixel value, then replacing the central pixel value in the window with the maximum pixel value;

after the traversing in the window having the window size is completed, reducing the window size by a predefined step size, and repeating the above traversing until the window size is 1 and a luminance channel of the image is obtained.

8. The image processing device according to claim 7, wherein the first circuit is specifically configured to:

perform the maximum-filtering processing on a luminance component of the original image and obtain the luminance channel.

9. The image processing device according to claim 7, wherein the second circuit is specifically configured to:

perform a Gaussian-filtering processing on the original image and obtain a guided image;

perform the guided-filtering processing on the obtained luminance channel through the obtained guided image, and estimate and obtain the incident component.

10. The image processing device according to claim 7, further comprising:

a third circuit, configured to perform, according to a predefined correction formula, a correction processing on the incident component estimated and obtained by the second circuit.

11. The image processing device according to claim 10, wherein, the correction formula comprises:

$$L' = W\left(\frac{L}{W}\right)^{\frac{1}{\gamma}},$$

wherein, $W=2^b-1$, b is a quantity of bits in the original image, $\gamma$ is a predefined correction factor.

12. The image processing device according to claim 7, wherein the maximum-filtering processing performed by the first circuit, comprises:

obtaining a maximum pixel value from neighborhood pixels and taking the maximum pixel value as a pixel value in an output image.

13. An image processing device, comprising:

a storage, a processor, and computer programs stored in the storage and executable by the processor, wherein the processor is configured to read and execute the computer programs in the storage and execute steps of the image processing method according to claim 1.

14. A non-transitory computer storage medium, comprising:

computer executable instructions stored on the non-volatile computer storage medium, wherein when the computer executable instructions are executed by a processor, steps of the image processing method according to claim 1 are executed by the processor.

15. The image processing method according to claim 1, wherein the number of rows and the number of columns of edges to be zero-padded may be calculated according to "(window size−1)/2".

16. The image processing device according to claim 7, wherein the number of rows and the number of columns of edges to be zero-padded may be calculated according to "(window size−1)/2".

* * * * *